US007539822B1

(12) United States Patent
Nagarajan et al.

(10) Patent No.: US 7,539,822 B1
(45) Date of Patent: May 26, 2009

(54) METHOD AND APPARATUS FOR FACILITATING FASTER EXECUTION OF CODE ON A MEMORY-CONSTRAINED COMPUTING DEVICE

(75) Inventors: Vijay G. Nagarajan, Los Gatos, CA (US); Bernd J. Mathiske, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 423 days.

(21) Appl. No.: 11/106,182

(22) Filed: Apr. 13, 2005

(51) Int. Cl.
*G06F 12/00* (2006.01)
*G06F 13/00* (2006.01)
*G06F 13/28* (2006.01)

(52) U.S. Cl. .................. 711/135; 711/118; 711/126; 711/161; 711/171

(58) Field of Classification Search ................. None
See application file for complete search history.

(56) References Cited

U.S. PATENT DOCUMENTS

2002/0099910 A1* 7/2002 Shah .................... 711/117
2003/0217248 A1* 11/2003 Nohl et al. ............... 712/208
2003/0229766 A1* 12/2003 Dice et al. ............... 711/154
2004/0167945 A1* 8/2004 Garthwaite ............... 707/206
2005/0055495 A1* 3/2005 Vihmalo et al. ........... 711/103
2005/0102657 A1* 5/2005 Lewis ..................... 717/140
2006/0059474 A1* 3/2006 Bhansali et al. ........... 717/151

OTHER PUBLICATIONS

Jim Handy, The Cache Memory Book, 1998, Academic Press, pp. 5-7, 64-66.*

* cited by examiner

*Primary Examiner*—Kevin L Ellis
*Assistant Examiner*—Chad L Davidson
(74) *Attorney, Agent, or Firm*—Park, Vaughan & Fleming LLP

(57) ABSTRACT

One embodiment of the present invention provides a system that facilitates faster execution of code on a memory-constrained computing device that has fast on-chip RAM, wherein the fast on-chip RAM is located on a processor chip, but is not cache memory. The system operates by copying a compiled method from an object heap to the fast on-chip RAM on the memory-constrained computing device. Additionally, the system updates an execution pointer to point to the compiled method in the fast on-chip RAM, wherein the execution pointer can also point to a compiled method in the object heap or an interpreted method in the object heap.

17 Claims, 2 Drawing Sheets

METHOD AND APPARATUS FOR FACILITATING FASTER EXECUTION OF CODE ON A MEMORY-CONSTRAINED COMPUTING DEVICE

BACKGROUND

1. Field of the Invention

The present invention relates to memory-constrained computing devices. More specifically, the present invention relates to a method and an apparatus for facilitating faster execution of code on a memory-constrained computing device that has fast on-chip RAM.

2. Related Art

The Java 2 Platform, Micro Edition (J2ME™), has become very popular in the wireless device space. Motorola, Nokia, NTT DoCoMo, RIM, Siemens, and many other key players in the wireless device industry have recently started shipping J2ME-enabled devices in very high volume. It has been estimated that over 200 million J2ME-enabled mobile phones were shipped in 2003 alone.

However, in spite of the success of the J2ME platform, significant challenges for Java™ technology remain in the memory-constrained device space. As mobile applications become increasingly complex, execution times increase significantly. This is especially a problem because many of these cell phones, including phones that feature the ARM7TDMI processor, have no CPU cache.

At the same time, many of these memory-constrained computing devices include a limited amount of user-managed "fast" RAM. This fast RAM operates at significantly faster access rates than the main memory on the device. The lack of a cache makes code execution slow unless code is copied to fast RAM. This is especially important in the context of a dynamic adaptive compiler in a JVM, which aims at executing as much "hot code" as possible in fast RAM.

Code caching in the fast RAM is not without its drawbacks. Only a very limited amount of code fits into fast RAM, typically less than the effective working set size. Moreover, fragmentation issues arise quickly given the minimal size of fast RAM.

Hence, what is needed is a method and an apparatus for facilitating faster execution of code on a memory-constrained computing device with fast RAM, without the problems listed above.

SUMMARY

One embodiment of the present invention provides a system that facilitates faster execution of code on a memory-constrained computing device that has fast on-chip RAM, wherein the fast on-chip RAM is located on a processor chip, but is not cache memory. The system operates by copying a compiled method from an object heap to the fast on-chip RAM on the memory-constrained computing device. Additionally, the system updates an execution pointer to point to the compiled method in the fast on-chip RAM, wherein the execution pointer can also point to a compiled method in the object heap or an interpreted method in the object heap.

In a variation on this embodiment, during a garbage-collection operation, the system clears the contents of the fast on-chip RAM. The system then examines the heap for the execution pointer that points to the compiled method in the fast on-chip RAM. If such an execution pointer is found, the system copies the compiled method from the object heap to the fast on-chip RAM, wherein the compiled method may be copied to a new location of the fast on-chip RAM. The system also updates the execution pointer to point to the compiled method in the fast on-chip RAM.

In a variation on this embodiment, during a garbage-collection operation, the system clears the contents of the fast on-chip RAM and updates the execution pointer to point to the compiled method in the object heap.

In a variation on this embodiment, during a garbage-collection operation, the system updates pointers in compiled methods in the fast on-chip RAM to point to the new locations of collected objects in the object heap, wherein pointers in the compiled methods in the fast on-chip RAM are updated but the compiled methods not relocated.

In a variation on this embodiment, a compiled method is copied to the fast on-chip RAM only if the compiled method is smaller than a predetermined size.

In a variation on this embodiment, the system ranks all compiled methods in the object heap in order of execution. The system then copies compiled methods which have rankings above a predetermined threshold to the fast on-chip RAM.

In a variation on this embodiment, the copying of compiled methods to the fast on-chip RAM only occurs during a garbage-collection operation.

In a variation on this embodiment, the processor is an ARM processor.

In a variation on this embodiment, the fast on-chip RAM has a one cycle access time.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Memory-Constrained Computing Device

Figure 1:
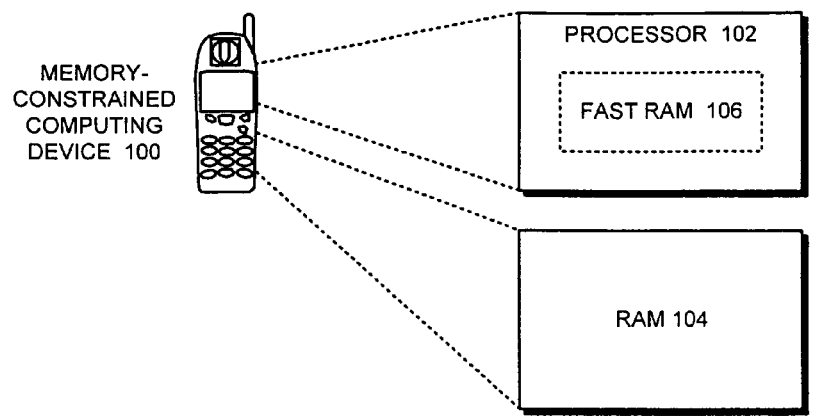
FIG. 1 illustrates a memory-constrained computing device in accordance with an embodiment of the present invention.

FIG. 1 illustrates a memory-constrained computing device 100 in accordance with an embodiment of the present invention. Memory-constrained computing device 100 includes processor 102 and RAM 104. In addition, processor 102 includes fast RAM 106. Fast RAM 106 is not cache memory; however, fast RAM 106 typically features a 1-2 cycle access time.

Code Caching in Fast Ram

Figure 2:
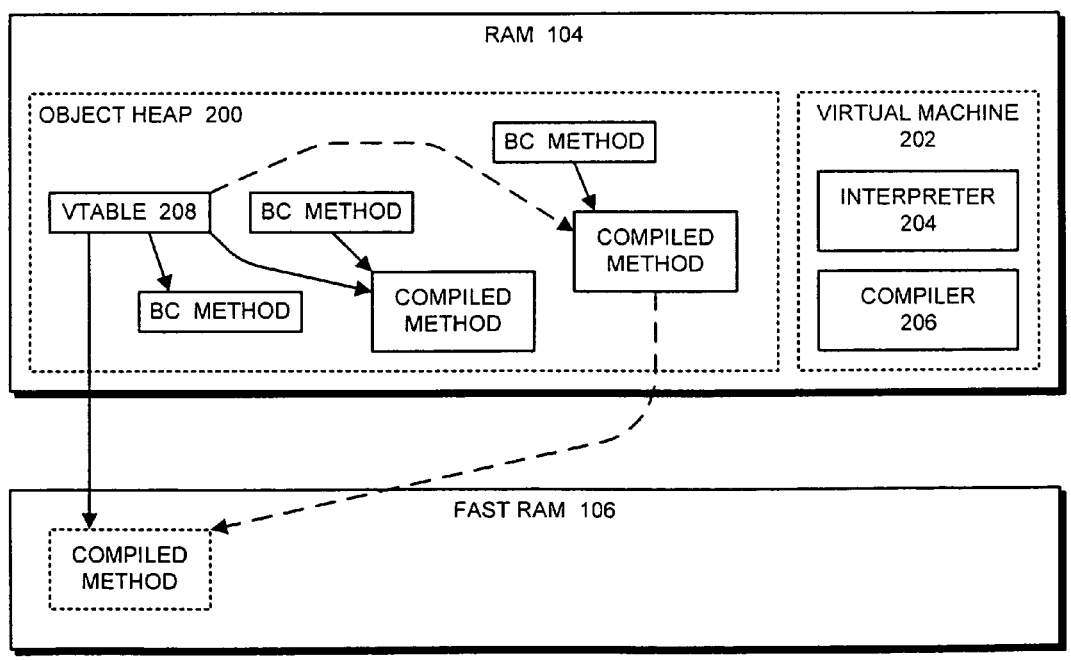
FIG. 2 illustrates code caching in fast RAM in accordance with an embodiment of the present invention.

FIG. 2 illustrates code caching in fast RAM 106 in accordance with an embodiment of the present invention. In the illustrated embodiment in FIG. 2, RAM 104 includes object heap 200 and Virtual Machine (VM) 202. VM 202 includes interpreter 204 and Dynamic Adaptive Compiler 206.

The embodiment illustrated in FIG. 2 builds on the idea of reusing object heap 200 as code cache repository, thereby integrating code caching and garbage collection. Such a scheme has been implemented in the Connected Limited Device Configuration HotSpot™ Implementation (CLDC HI), whose garbage collector has the capability to move methods and to relocate all pertinent pointers into them. (See "The CLDC HotSpot™ Implementation Virtual Machine" white paper from Sun Microsystems, Inc. of Santa Clara, Calif., http://java.sun.com/products/cldc/wp/CLDC_HI_WhitePaper.pdf).

At startup, VM 202 reserves a fixed size portion of fast RAM 106 for the purpose of serving as a special second level code cache. This "fast cache" will contain select methods that have first been compiled into the general "slow cache", which in the embodiment illustrated in FIG. 2 is embedded into object heap 200.

Adding a Method to Fast RAM

Figure 3:
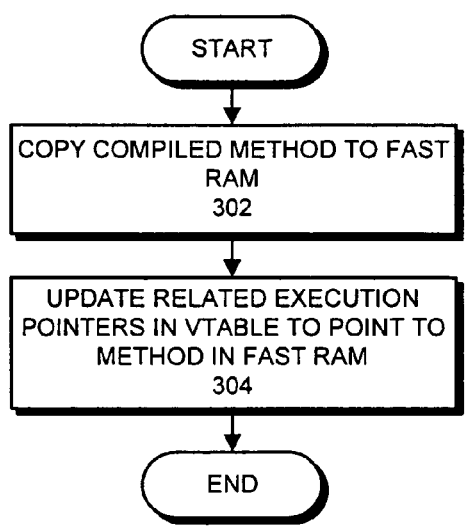
FIG. 3 presents a flow chart illustrating the process of adding a method to fast RAM in accordance with an embodiment of the present invention.

FIG. 3 presents a flow chart illustrating the process of adding a method to fast RAM 106 in accordance with an embodiment of the present invention. A VM that does not compile all methods it executes, such as VM 202, will already have a dynamic adaptive compilation strategy in place. This strategy will typically produce a ranking of "hot spots". The present invention simply copies the highest ranking methods into fast RAM as long as there is space available (step 302). Optionally, only methods below a certain size limit are considered.

The original copy of a fast-cached method stays in object heap 200, but related execution entry pointers are updated to point to the fast RAM representative (step 304). This can, for instance, happen by setting a virtual table entry in vtable 208. In cases where pointer chasing gets more involved, caching can be restricted to happen only at Garbage Collection (GC) time.

Evicting Methods from Fast RAM

Figure 4:
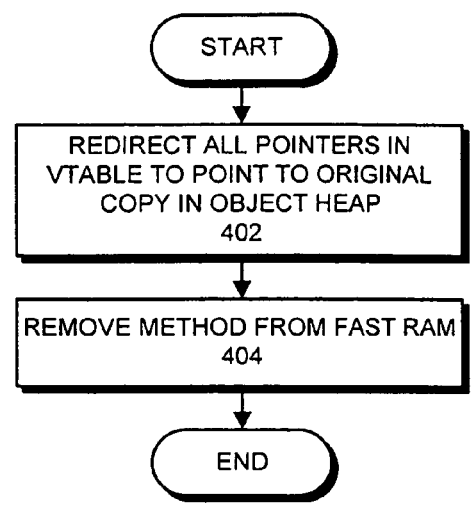
FIG. 4 presents a flow chart illustrating the process of evicting a method from fast RAM in accordance with an embodiment of the present invention.

FIG. 4 presents a flow chart illustrating the process of evicting a method from fast RAM 106 in accordance with an embodiment of the present invention. Eviction happens at GC time by redirecting all pointers to a victim to its original copy on object heap 200 (step 402), and the method is removed from fast RAM 106 (step 404). Victim selection is implemented the same way that general code caching operates, except with tightened thresholds. Additionally, one can also set a space goal, i.e. how much fast cache needs to be freed each GC. Note that in one embodiment of the present invention, all of the methods in fast RAM 106 are deleted during each GC, and their corresponding execution pointers are updated.

Compacting the Fast RAM

During GC, there is the opportunity to compact not only object heap 200, but also fast RAM 106. Compacting fast RAM 106 will increase the opportunity to cache more methods as execution progresses. Fast RAM 106 compaction can be woven into any mark/compact GC scheme. Cache survivors are GC roots. The fast RAM 106 area is basically treated as part of the object heap by most of the GC algorithm. During compaction target calculation, moving fast RAM 106 methods is treated specially. Instead of lumping them onto the main heap, they are accumulated at the base of fast RAM 106.

During the compacting and copying, fast RAM 106 is spared. At first, only object heap 200 is treated. Fast RAM 106 is filled by copying methods from object heap 200. For this purpose, the present invention can either keep a vector of pointers to cached methods or one can mark cached methods with an extra flag.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating faster execution of code and garbage collection on a memory-constrained computing device that has fast on-chip RAM, wherein the fast on-chip RAM is located on a processor chip, but is not cache memory, comprising:
   copying a compiled method from an object heap to a fast on-chip RAM on the memory-constrained computing device; and
   updating an execution pointer to point to the compiled method in the fast on-chip RAM, wherein the execution pointer otherwise points to a compiled method in the object heap or an interpreted method in the object heap, and
wherein the execution pointer is updated by setting a virtual table entry; and
   performing a garbage-collection operation by:
      clearing the contents of the fast on-chip RAM, wherein clearing the contents of the fast on-chip RAM involves deleting all compiled methods from the fast on-chip RAM, but retaining the compiled methods in the object heap;
      examining the object heap for one or more execution pointers that point to compiled methods in the fast on-chip RAM that were deleted from the fast on-chip RAM during the clearing operation; and
      if one or more execution pointers are found,
         copying the compiled methods pointed to by the one or more execution pointers from the object heap to the fast on-chip RAM, wherein the compiled methods may be copied to new locations in the fast on-chip RAM, and
         updating the one or more execution pointers to point to the compiled methods in the fast on-chip RAM.

2. The method of claim 1, wherein during a garbage-collection operation, the method further comprises:
   clearing the contents of the fast on-chip RAM; and
   updating the execution pointer to point to the compiled method in the object heap.

3. The method of claim 1, wherein performing a garbage-collection operation further comprises updating a pointer in a compiled method in the fast on-chip RAM to point to a location of an object in the object heap, wherein pointers in the compiled methods in the fast on-chip RAM are updated but the compiled methods are not relocated.

4. The method of claim 1, wherein a compiled method is copied to the fast on-chip RAM only if the compiled method is smaller than a predetermined size.

5. The method of claim 1, further comprising:
ranking all compiled methods in the object heap in order of execution; and
copying compiled methods with rankings above a predetermined threshold to the fast on-chip RAM.

6. The method of claim 1, wherein the copying of compiled methods to the fast on-chip RAM only occurs during a garbage-collection operation.

7. The method of claim 1, wherein the processor is an ARM processor.

8. The method of claim 1, wherein the fast on-chip RAM has a one cycle access time.

9. An apparatus for facilitating faster execution of code and garbage collection on a memory-constrained computing device that has fast on-chip RAM, wherein the fast on-chip RAM is located on a processor chip, but is not cache memory, comprising:
a copying mechanism configured to copy a compiled method from an object heap to the fast on-chip RAM on the memory-constrained computing device; and
an updating mechanism configured to update an execution pointer to point to the compiled method in the fast on-chip RAM, wherein the execution pointer otherwise points to a compiled method in the object heap or an interpreted method in the object heap, and wherein the execution pointer is updated by setting a virtual table entry;
a garbage-collection mechanism configured to perform a garbage-collection operation, wherein the garbage collection mechanism includes:
a clearing mechanism configured to clear the contents of the fast on-chip RAM, wherein clearing the contents of the fast on-chip RAM involves deleting all compiled methods from the fast on-chip RAM, but retaining the compiled methods in the object heap;
an examination mechanism configured to examine the object heap for one or more execution pointers that point to the compiled method in the fast on-chip RAM that were deleted from the fast on-chip RAM during the clearing operation;
a copying mechanism configured to copy the compiled methods pointed to by the one or more execution pointers from the object heap to the fast on-chip RAM, wherein the compiled methods may be copied to new locations in the fast on-chip RAM; and
an updating mechanism configured to update the one or more execution pointers to point to the corresponding compiled methods in the fast on-chip RAM.

10. The apparatus of claim 9, further comprising:
a clearing mechanism configured to clear the contents of the fast on-chip RAM;
wherein the updating mechanism is further configured to update the execution pointer to point to the compiled method in the object heap; and
wherein the apparatus is configured to operate during a garbage-collection operation.

11. The apparatus of claim 9, wherein during a garbage collection operation the updating mechanism is further configured to update a pointer in a compiled method in the fast on-chip RAM to point to a location of an object in the object heap, wherein pointers in the compiled methods in the fast on-chip RAM are updated but the compiled methods are not relocated.

12. The apparatus of claim 9, wherein the copying mechanism is further configured to copy a compiled method to the fast on-chip RAM only if the compiled method is smaller than a predetermined size.

13. The apparatus of claim 9, further comprising:
a ranking mechanism configured to rank all compiled methods in the object heap in order of execution; and
wherein the copying mechanism is further configured to copy compiled methods with rankings above a predetermined threshold to the fast on-chip RAM.

14. The apparatus of claim 9, wherein the copying mechanism is further configured to copy compiled methods to the fast on-chip RAM during a garbage-collection operation.

15. The apparatus of claim 9, wherein the processor is an ARM processor.

16. The apparatus of claim 9, wherein the fast on-chip RAM has a one cycle access time.

17. A computing system with a mechanism for facilitating faster execution of code and garbage collection, comprising:
a processor located on a processor chip;
a fast on-chip RAM which is located on the processor chip, but is not cache memory;
a copying mechanism configured to copy a compiled method from an object heap to the fast on-chip RAM on the memory-constrained computing device; and
an updating mechanism configured to update an execution pointer to point to the compiled method in the fast on-chip RAM, wherein the execution pointer otherwise points to a compiled method in the object heap or an interpreted method in the object heap;
a garbage-collection mechanism configured to perform a garbage-collection operation, wherein the garbage collection mechanism includes:
a clearing mechanism configured to clear the contents of the fast on-chip RAM, wherein clearing the contents of the fast on-chip RAM involves deleting all compiled methods from the fast on-chip RAM, but retaining the compiled methods in the object heap;
an examination mechanism configured to examine the object heap for one or more execution pointers that point to the compiled method in the fast on-chip RAM that were deleted from the fast on-chip RAM during the clearing operation;
a copying mechanism configured to copy the compiled methods pointed to by the one or more execution pointers from the object heap to the fast on-chip RAM, wherein the compiled methods may be copied to new locations in the fast on-chip RAM; and
an updating mechanism configured to update the one or more execution pointers to point to the corresponding compiled methods in the fast on-chip RAM.

* * * * *